(12) United States Patent
Hofbauer et al.

(10) Patent No.: US 9,541,198 B2
(45) Date of Patent: Jan. 10, 2017

(54) TWO-PART STATIONARY RING FOR DEVICES HAVING PISTONS

(71) Applicant: EcoMotors, Inc., Allen Park, MI (US)

(72) Inventors: Peter Hofbauer, West Bloomfield, MI (US); Diana Brehob, Dearborn, MI (US)

(73) Assignee: EcoMotors, Inc., Allen Park, MI (US)

( * ) Notice: Subject to any disclaimer, the term of this patent is extended or adjusted under 35 U.S.C. 154(b) by 400 days.

(21) Appl. No.: 14/244,925

(22) Filed: Apr. 4, 2014

(65) Prior Publication Data
US 2014/0298984 A1 Oct. 9, 2014

Related U.S. Application Data

(60) Provisional application No. 61/808,368, filed on Apr. 4, 2013.

(51) Int. Cl.
| | | |
|---|---|---|
| F01B 31/00 | (2006.01) |
| F16J 9/24 | (2006.01) |
| F16J 9/20 | (2006.01) |
| F16J 9/02 | (2006.01) |
| F16J 9/16 | (2006.01) |

(52) U.S. Cl.
CPC .. F16J 9/24 (2013.01); F16J 9/02 (2013.01); F16J 9/16 (2013.01); F16J 9/203 (2013.01); *Y10T 29/49229* (2015.01)

(58) Field of Classification Search
CPC .............. F16J 9/02; F16J 9/26; F16J 9/203; F16J 9/24
See application file for complete search history.

(56) References Cited

U.S. PATENT DOCUMENTS

| | | | | |
|---|---|---|---|---|
| 2,213,452 | A | 11/1938 | Paton | |
| 2,951,732 | A | 2/1957 | Brenneke | |
| 2,893,797 | A | 7/1959 | Brenneke | |
| 6,378,872 | B1 * | 4/2002 | Moriarty | F16J 9/24 277/446 |
| 7,735,834 | B2 * | 6/2010 | Hofbauer | F16J 9/02 277/489 |
| 8,807,571 | B2 * | 8/2014 | Chalk | F16J 9/16 277/490 |
| 2006/0249913 | A1 * | 11/2006 | Nessa | F16J 9/16 277/493 |

* cited by examiner

*Primary Examiner* — Michael Leslie
(74) *Attorney, Agent, or Firm* — Barnes & Thornburg LLP

(57) ABSTRACT

In some two-stroke engines, a stationary ring is disposed in a groove in the cylinder liner. However, it is a challenge to install such a stationary ring while maintaining a narrow gap to minimize gas flow through the gap. A ring system for an internal combustion engine is disclosed that includes an L-shaped, split ring with a reentrant angle and a nested, split ring with a convex quadrilateral cross section nested with the L-shaped ring proximate the reentrant angle. The two rings are affixed so that the two gaps of the split rings cannot align. Or, in other embodiments, the two are allowed to rotate relative to each other over a predetermined angle.

18 Claims, 3 Drawing Sheets

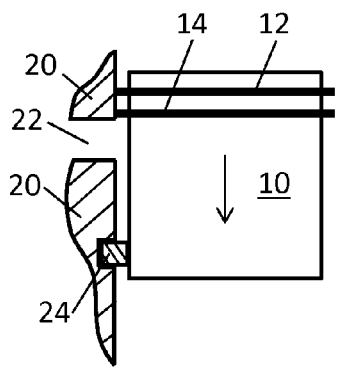
Figure 1a
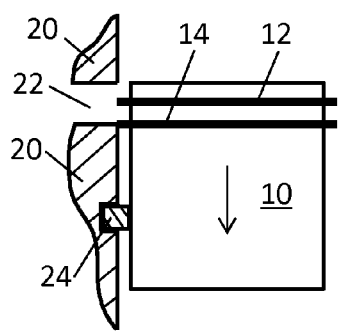
Figure 1b
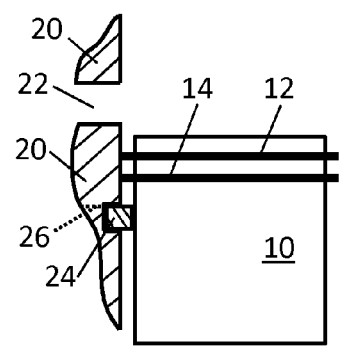
Figure 1c
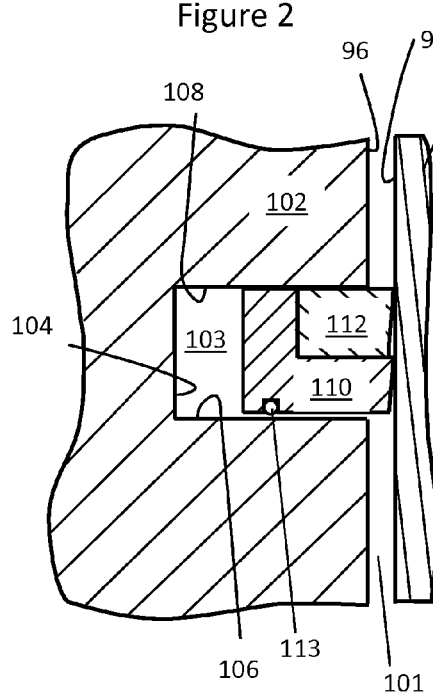
Figure 2
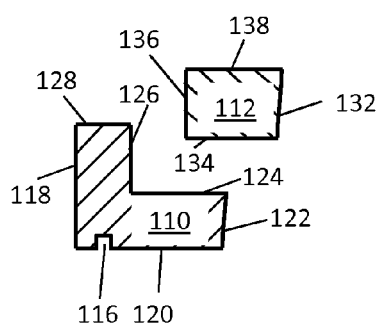
Figure 3
Figure 4
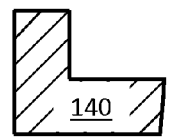
Figure 5
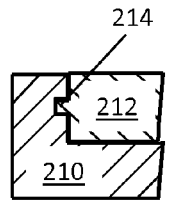
Figure 6
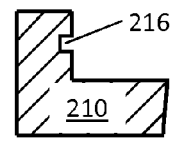
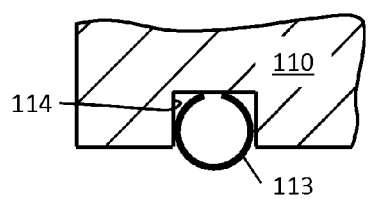
Figure 2a
Figure 7
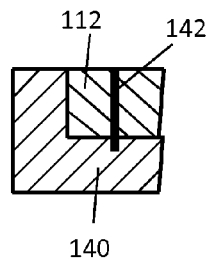
Figure 8
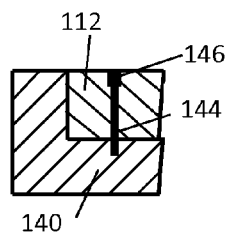

TWO-PART STATIONARY RING FOR DEVICES HAVING PISTONS

FIELD

The present disclosure relates to stationary rings for devices that have reciprocating pistons, such as internal combustion engines and compressors.

BACKGROUND

Pistons in two-stroke engines have compression rings like their four-stroke counterparts. Some two-stroke engines that have ports in the cylinder wall, which are covered and uncovered by a piston, have an additional oil ring in the piston that is below the ports. The oil ring prevents oil that is splashing around for lubrication and cooling from too much access to the ports and being combusted in the combustion chamber or leaving directly through exhaust ports. The oil ring also provides oil dosing, to allow some oil to lubricate the compression rings and the piston skirt. In addition, the oil ring in a two-stroke engine has to seal the pressurized air at the intake ports or the exhaust gas at the exhaust ports from escaping into the crankcase. Such an arrangement leads to a piston or liner that is longer than may be desirable for some applications. An alternative is to provide a sealing ring (stationary ring) in a groove in the cylinder wall such as is shown in FIGS. 1a-c.

In FIG. 1a, a piston 10 having compression rings 12 and 14 is traveling downward within a cylinder wall 20 (only a portion of one side of the wall is shown in the cross section in FIG. 1a) that has ports 22 in the wall to allow flow of gases into the cylinder, if the ports are intake ports, and flow of gases out of the cylinder, if the ports are exhaust ports. A circumferential groove is formed in cylinder wall 20 into which a stationary oil ring 24 is placed. In FIG. 1a, piston 10 is in a position such that compression rings 12 and 14 are above port 22. Thus, the combustion chamber (above piston 10) is sealed off from port 22. Piston 10 is moving downward and at the instant illustrated in FIG. 1b, port 22 is in communication with the combustion chamber. As piston 10 moves downward farther, as illustrated in FIG. 1c, piston 10 completely uncovers port 22.

A view of a piston 370 in a cylinder liner 368 is shown in FIG. 13. Piston 370 has compression rings 374. Cylinder liner 368 has ports 376 and a groove 372 defined there. A stationary ring may be installed in groove 372 to assist with oil and/or gas control.

Cylinder wall 20 in FIGS. 1a-c is shown as one piece. However, stationary oil ring 24, which is a split ring, has a large gap if inserted into cylinder wall 20 and then sprung into the groove in the cylinder liner. In some alternatives, the cylinder wall is formed out of two pieces. In FIG. 1c, a dotted line 26 in cylinder wall 20 indicates a parting line that can be used in a two-piece cylinder liner to facilitate installation of stationary oil ring 24. Problems with two-piece cylinder liners include: increased weight to include a flange and bolts to secure the two pieces together and difficulty in ensuring that the cylinder walls of the two pieces are perfectly aligned and machined properly. A ring system that facilitates installation into a one-piece cylinder liner is desired.

SUMMARY

To overcome at least one problem with prior art systems, a ring system that can be used in a device having a reciprocating piston, such as an internal combustion engine or a compressor, includes an L-shaped, split ring with a reentrant angle; a nested, split ring with a convex quadrilateral cross section nested with the L-shaped ring proximate the reentrant angle; and a feature between the L-shaped and nested rings that limits relative, rotational movement between the rings to less than a predetermined angle wherein the L-shaped and nested rings are adapted to be installed into a groove in a cylinder wall of the device.

In one embodiment, the feature is a pin and the predetermined angle is substantially zero. In another embodiment, the feature is one of a weld and braze joint and the predetermined angle is substantially zero. In yet another embodiment, a groove is formed in a predetermined angle of the circumference of one of the L-shaped ring and the nested ring proximate the reentrant angle and a tab is formed in the other of the L-shaped ring and the nested ring. The tab engages with the groove. The tab is the feature that limits relative rotational movement between the rings with the predetermined angle being less than 160 degrees.

The ring system may further include a groove in a surface of the L-shaped ring located in a wall of the L-shaped ring proximate a surface of the groove in the cylinder wall and a continuous ring inserted in the groove in the L-shaped ring.

A gap in the L-shaped ring and a gap in the nested ring are circumferentially displaced from each other to reduce gas flow between first and second sides of the L-shaped and nested rings.

Also disclosed is a piston-and-cylinder assembly having a cylinder wall having a groove formed therein, a piston disposed within the cylinder wall, an L-shaped, split ring with a reentrant angle disposed in the groove, and a nested, split ring with a convex quadrilateral cross section nested with the L-shaped ring proximate the reentrant angle. In some embodiments, the L-shaped and nested rings are affixed by one of pinning, welding, and brazing to prevent relative, rotational movement between the rings. The piston is adapted to reciprocate within the cylinder wall. Surfaces of the L-shaped and nested rings proximate the piston form an acute angle with respect to a surface of the piston.

The L-shaped and nested rings bear on the piston surface. The L-shaped and nested rings are adapted to scrape oil from the piston surface. The assembly is part of one of an internal combustion engine or a compressor.

Some embodiments include: a groove defined in a surface of the L-shaped ring in a wall of the L-shaped ring proximate a surface of the groove in the cylinder wall and a continuous ring element inserted in the groove in the L-shaped ring. Continuous refers to a ring without a split.

A gap in the L-shaped ring and a gap in the nested ring are circumferentially displaced from each other to reduce gas flow between first and second sides of the L-shaped and nested rings.

A diameter of an outer surface of the L-shaped ring is greater than a diameter of the cylinder wall when the L-shaped ring is in its neutral position. When the L-shaped ring is contracted so that the L-shaped ring has a diameter substantially equal to the diameter of the cylinder wall, the gap in the split ring is nearly zero. When the L-shaped ring is expanded to allow insertion of the piston into the L-shaped ring and then released, the L-shaped ring presses against the piston.

Also disclosed is a method to install a ring system, including: nesting an L-shaped ring and a nested ring. The L-shaped ring is a split ring with a reentrant angle. The nested ring has a convex quadrilateral cross section. The L-shaped ring nests with the nested ring proximate the reentrant angle. The method may further include: compressing the L-shaped and nested rings; inserting the compressed rings into a cylinder liner; and moving the compressed rings into a groove in the cylinder liner whereby the compressed rings attain a neutral position in the groove. The method further includes: expanding the compressed rings such that they expand into the groove in the cylinder and inserting the piston inside the expanded rings.

In some embodiments, the method also includes affixing the L-shaped ring and the nested ring by one of: pinning, brazing, or welding.

In some embodiments, a circumferential groove is formed in the L-shaped ring proximate the reentrant angle. The circumferential groove extends over only a portion of the L-shaped ring. A tab is formed on an outer surface of the nested ring. The tab engages with the circumferential groove in the L-shaped ring.

In some embodiment, a groove is formed in a surface of the L-shaped ring in a wall of the L-shaped ring proximate a surface of the groove in the cylinder wall. An elastomeric or metallic continuous element may be inserted in the groove in the L-shaped ring.

BRIEF DESCRIPTION OF THE DRAWINGS

FIGS. 1a-c are cross-sectional views through the cylinder liner of a portion of a piston-ported engine;

FIG. 2 is a cross-sectional view of a section of the piston and cylinder liner with an L-shaped ring and a nested ring in a groove in the cylinder liner;

FIG. 2a is a detail of a portion of the L-ring, the groove in the L-ring, and the sealing element disposed in the groove.

FIGS. 3-8 are cross sections of embodiments of the L-shaped and nested rings:

DETAILED DESCRIPTION

Figure 9:
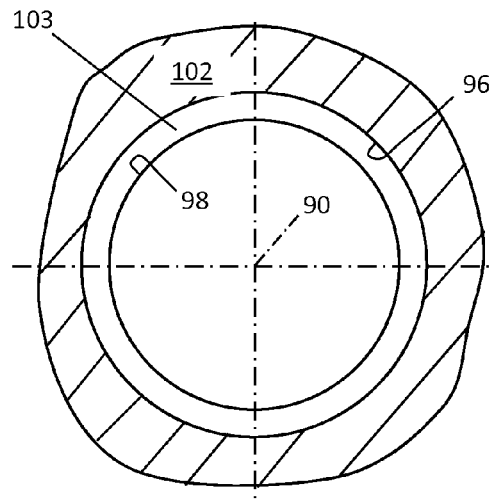
FIGS. 9-12 are cross sections of a cylinder liner illustrating steps to install the L-shaped and nested rings.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

In FIG. 2, a cross section of a ring system or ring assembly according to an embodiment of the disclosure is shown. A portion of a piston 100 is shown proximate a portion of a cylinder liner 102 in cross section. A surface 96 of liner 102 is displaced from a surface 98 of piston 102 by a gap 101. To substantially prevent gases flowing through gap 101, a split ring or, in this case a pair of split rings 110 and 112 are provided. The rings are provided in a groove 103 that has an end surface 104 a bottom surface 106 and a top surface 108. Split ring 110 has a groove in a surface proximate bottom surface 106 of groove 103. A ring 113 is placed in the groove. A detail of split ring 110 and ring 114 is shown in FIG. 2a. A groove 114 in ring 110 has a metallic ring that is mostly circular in cross section, but has a split. FIG. 2a is an illustration of one exemplary embodiment and is not intended to be limiting.

In FIG. 3, split rings 110 and 112 are shown in more detail. Ring 110 is roughly L shaped with surfaces 118, 120, 122, 124, 126, and 128. Surfaces 124 and 126 form the interior of the L and are perpendicular to each other. Surfaces 118, 120, and 128 are also perpendicular in relation to surfaces 124 and 126. Surface 122, which faces toward surface 98 of piston 100 (as assembled), has a slight angle. The intersection of surfaces 122 and 124 scrapes on surface 98 of piston 100 to remove excess oil during operation of the engine. The intersection of surfaces 122 and 124 appears as a point in FIG. 3, but in practice forms a small surface parallel to the wall on which it rides. Surfaces 124 and 126 are described as being perpendicular. However, in other embodiments, a different angle between the two surfaces can be used, but should match the angle formed between 134 and 136 of ring 112 that nests with L-ring 110.

For purposes of distinguishing surfaces herein, the following nomenclature is used, as shown in FIG. 3: L-ring 110, nested ring 112, outer surface of L-ring 118, scraper surface of L-ring 122, bottom surface of L-ring 120, horizontal inner surface of L-ring 124, vertical inner surface of L-ring 126, outer surface 136 of nested ring 112, left surface of nest ring 134, right surface of nested ring 138, and scraper surface of nested ring 132.

L-ring 110 has a groove 114 to accommodate a sealing member 113, the sealing member shown in FIGS. 2 and 2a. An alternative L-ring 140 is shown in FIG. 4 that has no such groove. In such an alternative, the ring may be designed to fit tighter in the groove in the cylinder liner because there is no sealing member.

In FIG. 5 a nested ring 212 that has a tab 214 is shown with tab 214 engaging in a groove in an L-ring 210. The groove in L-ring 210 can be provided over a small portion of the circumference, e.g., 5 degrees. In another alternative, the groove could be provided over 135 degrees. A greater range is undesirable as it would allow the gaps in nested ring 212 and L-ring 210 (gaps not visible in FIG. 5) to align, which would allow gases to easily flow past the ring assembly. A groove 216 in L-ring 210 is visible in FIG. 6. There may be advantages to allow the rings to rotate with respect to each other to prevent buildup of deposits and potential ring sticking.

In an alternative, L-ring 140 and nested ring 112 are pinned together with a pin 142 by first providing a hole in each and then inserting pin 142. When the pin is installed and then the ring is installed with the groove in the cylinder wall, the pin does not back out because it would hit a wall of the groove in the cylinder wall. In an alternative shown in FIG. 8, a pin 144 is installed through an orifice that extends through nested ring 112 and L-ring 140. To ensure that pin 144 does not fall out, a plug 146 is installed in a countersunk hole in nested ring 112.

The assembly of an engine with such a ring pack is described in conjunction with FIGS. 9-12. FIGS. 9-12 exaggerate the sizes of the nested and L-shaped rings for illustration purposes only. FIG. 9 shows a cross section of cylinder wall 102 as taken through groove 103. The center of cylinder wall 102 is identified as 90. Groove 103 extends through the inside surface 98 of the cylinder wall to the inside surface 96 of the groove.

Figure 10:
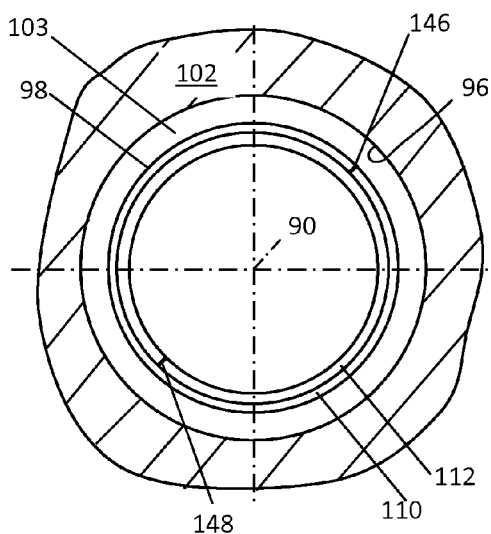

In FIG. 10, split rings 110 and 112 are compressed so that they fit within the inside surface 98 of cylinder wall 102 so that split rings 110 and 112 can be slid into cylinder wall 102 to the area where groove 103 is located. When compressed, the ends of rings 110 and 112 are touching, shown as splits 146 and 148, respectively.

Figure 11:
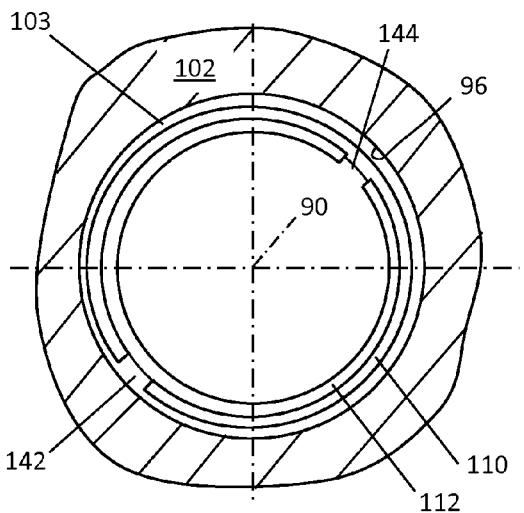

In FIG. 11, split rings 110 and 112 are allowed to expand to their neutral position, which is only possible within groove 103. Splits 142 and 144 are noticeable in rings 110 and 112, respectively, as the rings expand. In one non-limiting embodiment, splits 142 and 144 include about 10 degrees of circumference.

Figure 12:
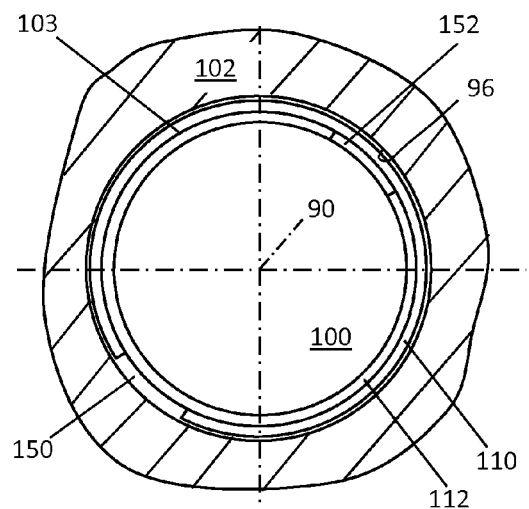

In FIG. 12, split rings 142 and 144 are expanded, in one embodiment via a special tool, so that they have splits 150 and 152, respectively, which are, in a non-limiting embodiment, about 20 degrees of the circumference. Piston 100 is inserted into the cylinder so that split rings 110 and 112 remain expanded such that they tend toward the neutral position and consequently exert a force on the piston to scrape oil off the piston.

In FIGS. 10-12, the gap (or touching ends in FIG. 10) in split rings 110 and 112 are substantially diametrically opposed to each other. It is not imperative that they are evenly spaced. However, it is important that they not overlap or come close to overlapping. If the cross section in FIG. 2 were taken through the split in L-ring 110 in a region of the gap in L-ring 110, nested ring 112 would provide sealing. If the cross section in FIG. 1 were taken through the split in nested ring 112 in a region of the gap in nested ring 112, L-ring would provide the sealing. But, this is only the case if alignment of the gaps in the two rings can be prevented, which is accomplished by an arrangement such as: tab 214 in FIG. 5, pin 142 in FIG. 7, pin 144 in FIG. 8, or other suitable engagement feature.

Figure 14:
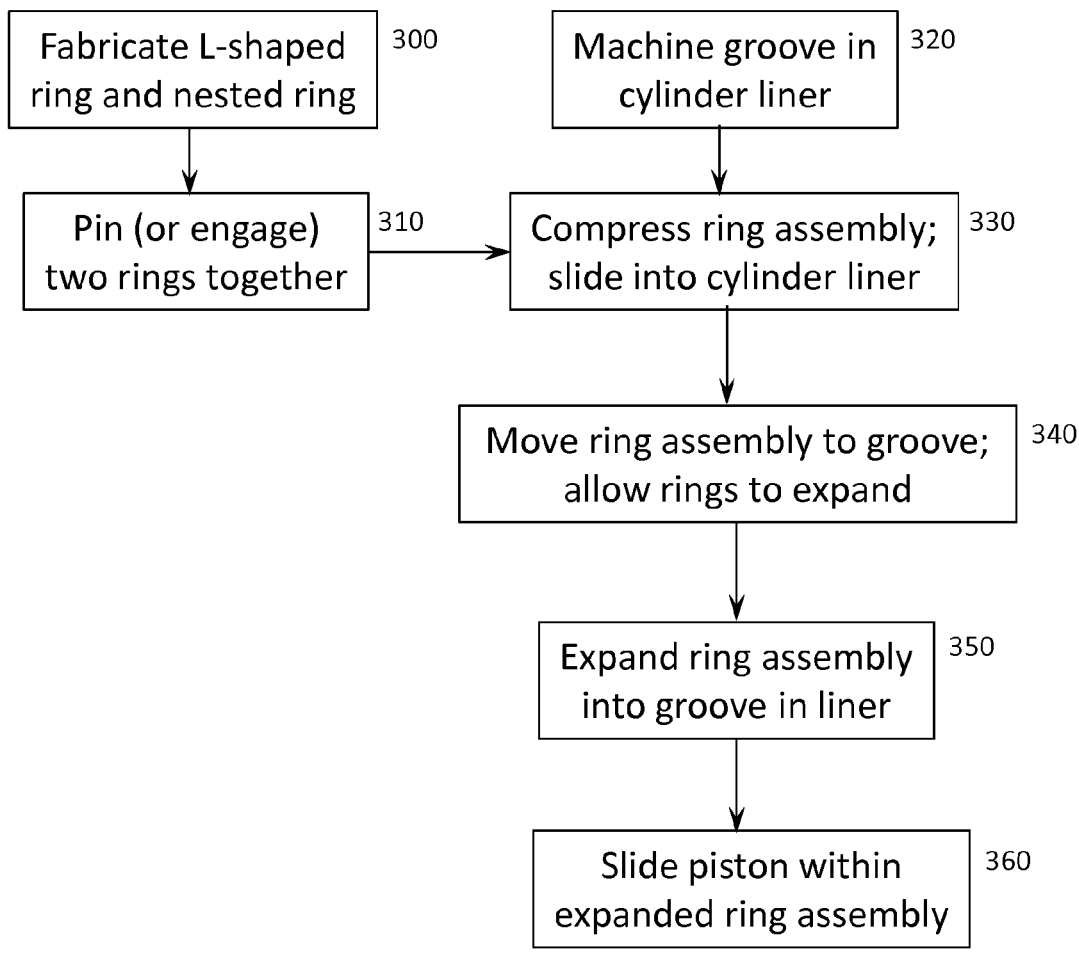
FIG. 14 is a flowchart indicating assembly of the engine with the stationary rings according to an embodiment of the disclosure.
Figure 13:
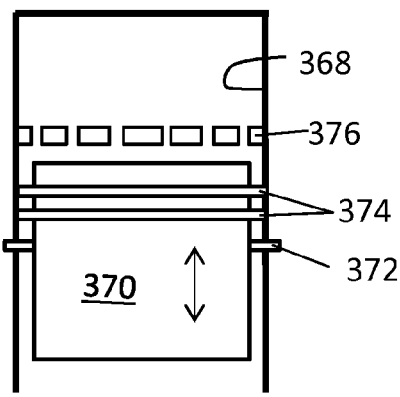
FIG. 13 is a cross section of a portion of a piston-ported engine showing a groove into which a stationary ring may be disposed.

Referring to the flowchart in FIG. 14, the L-shaped and nested rings are fabricated in block 300. This includes any machining to cause the two to fit together as desired. The two are pinned together in block 310. In an alternate embodiment, a pin in one of the rings extends into a groove in the other of the rings such that the rings are engaged. The rings are allowed to rotate with respect to each other, but are limited to a particular predetermined range with the range limited by the extent of the groove in the ring. In block 320, a groove is formed into a one-piece cylinder liner. In block 330, the ring assembly from block 310 is inserted into the cylinder liner. In block 330, the ring assembly is compressed to be a smaller diameter (less than or equal to the cylinder liner diameter) than its neutral position so that it can be inserted into the cylinder liner. In block 340, the ring assembly is slid to the groove in the cylinder liner and allowed to expand to its neutral position, i.e., fitting into the groove. In block 350, the ring assembly is expanded such that more of the ring assembly is within the cylinder liner groove. This may be accomplished with a special tool or, alternatively, by a chamfer on the piston skirt. A piston is inserted into the cylinder liner and within the expanded ring assembly in block 360. When the ring assembly is released from the expanded position, it does not contract to its neutral position but instead exerts a force on the outer surface of the piston.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. A ring system for a device having a reciprocating piston, comprising:
   an L-shaped, split ring with a reentrant angle;
   a nested, split ring having a convex quadrilateral cross section nested with the L-shaped ring proximate the reentrant angle; and
   a feature associated with at least one of the L-shaped and nested rings that limits relative, rotational movement between the rings to less than a predetermined angle, wherein the L-shaped and nested rings are adapted to be installed into a groove in a cylinder wall of the device, and wherein the feature is one of a weld and braze joint and the predetermined angle is substantially zero.

2. The ring system of claim 1, further comprising:
   a groove in a surface of the L-shaped ring located in a wall of the L-shaped ring proximate a surface of the groove in the cylinder wall; and
   a continuous ring inserted in the groove in the L-shaped ring.

3. The ring system of claim 1 wherein a gap in the L-shaped ring and a gap in the nested ring are circumferentially displaced from each other to reduce gas flow between first and second sides of the L-shaped and nested rings.

4. A ring system for a device having a reciprocating piston, comprising:
   an L-shaped, split ring with a reentrant angle;
   a nested, split ring having a convex Quadrilateral cross section nested with the L-shaped ring proximate the reentrant angle; and
a feature associated with at least one of the L-shaped and nested rings that limits relative, rotational movement between the rings to less than a predetermined angle, wherein the L-shaped and nested rings are adapted to be installed into a groove in a cylinder wall of the device, and wherein the feature includes
   a groove formed in a predetermined angle of the circumference of one of the L-shaped ring and the nested ring proximate the reentrant angle and a tab formed in the other of the L-shaped ring and the nested ring wherein the tab engages with the groove.

5. The ring system of claim 4 wherein the predetermined angle is less than 160 degrees.

6. The ring system of claim 4, further comprising:
   a groove in a surface of the L-shaped ring located in a wall of the L-shaped ring proximate a surface of the groove in the cylinder wall; and
   a continuous ring inserted in the groove in the L-shaped ring.

7. The ring system of claim 4, wherein a gap in the L-shaped ring and a gap in the nested ring are circumferentially displaced from each other to reduce gas flow between first and second sides of the L-shaped and nested rings.

8. A piston-and-cylinder assembly, comprising:
a cylinder wall having a circumferential groove formed therein;
a piston disposed within the cylinder wall;
an L-shaped, split ring with a reentrant angle disposed in the groove; and
a nested, split ring with a convex quadrilateral cross section nested with the L-shaped ring proximate the reentrant angle, wherein the L-shaped and nested rings are affixed by one of pinning, welding, and brazing to prevent relative, rotational movement between the rings.

9. The assembly of claim 8 wherein the piston is adapted to reciprocate within the cylinder wall; and the L-shaped and nested rings bear on a surface of the piston.

10. The assembly of claim 9 wherein:
the L-shaped and nested rings are adapted to scrape oil from the piston surface; and
the assembly is part of one of an internal combustion engine and a compressor.

11. The assembly of claim 8, further comprising:
a groove defined in a surface of the L-shaped ring in a wall of the L-shaped ring proximate a surface of the groove in the cylinder wall; and
a continuous ring element inserted in the groove in the L-shaped ring.

12. The assembly of claim 8 wherein a gap in the L-shaped ring and a gap in the nested ring are circumferentially displaced from each other to reduce gas flow between first and second sides of the L-shaped and nested rings.

13. The assembly of claim 8 wherein when the L-shaped ring is contracted so that the L-shaped ring has an outer diameter substantially equal to an inner diameter of the cylinder wall, a gap in the L-shaped split ring is zero.

14. The assembly of claim 8 wherein the L-shaped ring is expanded to allow insertion of the piston into the L-shaped ring and when the expanded L-shaped ring is released, the expanded L-shaped ring presses against the piston.

15. A method to install a ring system, comprising:
nesting an L-shaped ring and a nested ring wherein: the L-shaped ring is a split ring with a reentrant angle; the nested ring has a convex quadrilateral cross section; and the L-shaped ring nests with the nested ring proximate the reentrant angle;
compressing the L-shaped and nested rings;
inserting the compressed rings into a cylinder liner;
moving the compressed rings into a groove in the cylinder liner whereby the compressed rings attain a neutral position in the groove; and
affixing the L-shaped ring and the nested ring by one of: pinning, brazing, and welding.

16. The method of claim 15, further comprising:
expanding the compressed rings such that they expand into the groove in the cylinder; and
inserting the piston inside the expanded rings.

17. The method of claim 15, further comprising:
forming a circumferential groove in the L-shaped ring proximate the reentrant angle with the circumferential groove extending over only a portion of the L-shaped ring;
forming a tab on an outer surface of the nested ring; and
engaging the tab with the circumferential groove in the L-shaped ring.

18. The method of claim 15, further comprising:
forming a groove in a surface of the L-shaped ring in a wall of the L-shaped ring proximate a surface of the groove in the cylinder wall; and
inserting a continuous ring element in the groove in the L-shaped ring.

* * * * *